Patented Apr. 17, 1923.

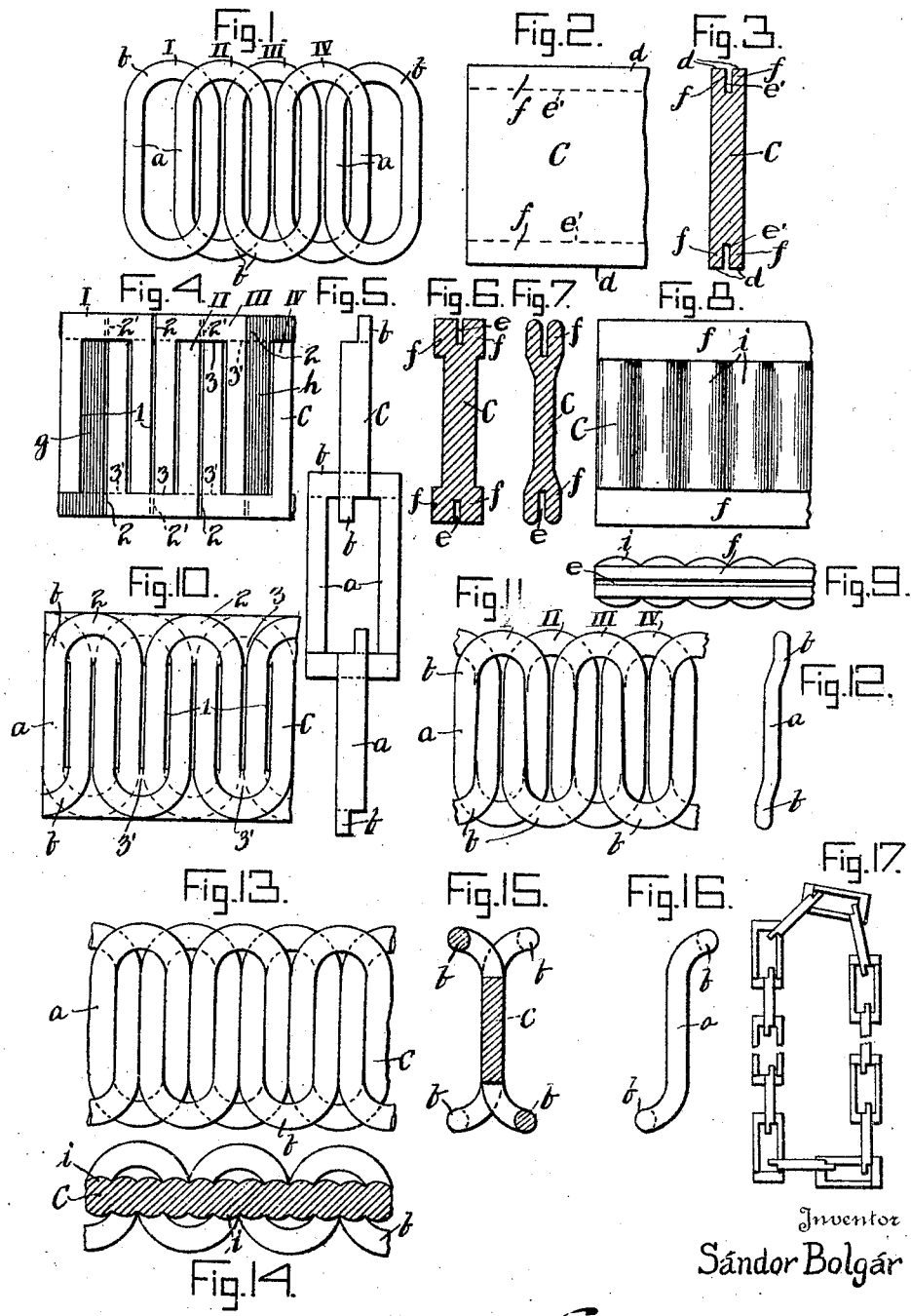

1,452,408

UNITED STATES PATENT OFFICE.

SÁNDOR BOLGÁR, OF VIENNA, AUSTRIA, ASSIGNOR TO JULIUS BREYER, OF NASHVILLE, TENNESSEE.

CHAIN AND METHOD OF MAKING SAME.

Application filed December 23, 1921. Serial No. 524,498.

*To all whom it may concern:*

Be it known that I, SÁNDOR BOLGÁR, a citizen of Hungary, residing at Vienna, Austria, have invented certain new and useful Improvements in Chains and Methods of Making Same, of which the following is a specification.

The making of chains is known to be very troublesome and time-consuming for the reason that each single chain element is made separately and after being attached to the finished portion of the chain has to be closed by welding or soldering. The joints where the welding or soldering takes place weaken the chain and render calculation of permissible loads unreliable.

To simplify the manufacture of chains and to avoid the forming of welded or soldered joints many different propositions have been advanced. It has been proposed to render soldering and welding unnecessary, for example, by providing single links with closed loops or knots by means of which the links can be attached to one another; this method avoids the welded joints, but is not easy and the chains made thereby have little strength and by reason of their peculiar form and their flexibility are useless for many purposes. It has also been suggested that ordinary chains be formed by rolling out of a single piece of stock or by milling, sawing or the like out of a bar of cruciform section. These methods are very complicated, they require troublesome and expensive subsequent finishing processes and are accompanied by a considerable loss of material.

The object of the foregoing invention is to provide a method for the making of seamless or so-called weldless chains in which the difficulties of the above described methods are not encountered. The substance of the invention consists therein that the face edges *d* of a blank in the shape of a band or plate C are formed with the grooves *e* and the end portions *b* of the links of the chain are formed from the edges separated by said grooves, this being done by means of cuts extending from the sides of the piece of stock to said grooves *e*, such cuts being alternately on opposite sides of the stock (see 2', 3' and etc. Fig. 4), while the shanks or sides *a* of the links are formed from the intermediate or body portion of the blank by means of cuts *l* extending therethrough in a direction transversely to its length. The blank can be provided in the desired form by forging, stamping, pressing, rolling, molding, casting, or in any other conventional manner.

Referring to the accompanying drawings which are made a part hereof and on which similar reference characters indicate similar parts, Figure 1 shows a conventional chain whose members are brought into that relation in which they occurred in the band or plate-like blank prior to the severing operation, Figures 2 and 3 show in plan and section a blank from which a chain with rectangular members is to be formed, Figure 4 shows the position of the lines of severance by means of which the blank in Figures 2 and 3 is separated into links, Figure 5 shows three finished links in the position assumed thereby in use, Figures 6 and 7 show in section two other forms of stock, Figures 8 and 9 show in side view and in plan respectively, a piece of stock for formation of a chain in which the shanks or side members of the links have rounded corners, Figure 10 shows in plan a blank for the making of chains comprising oval members with lines of severance as indicated.

Figures 11 and 12 show a chain produced from the blank of Figure 10,

Figures 13, 14 and 15 show in plan and in longitudinal and transverse section a blank formed by casting for the making of weldless chains.

Figure 16 shows a link formed from the blank in Figure 13.

Figure 17 shows an endless, weldless chain which is a feature of my invention.

As Figure 1 indicates, the members I, II, III and IV of a chain are placed in such a position that the portions *a* of each link, which in use lie parallel to the direction of the chain and which hereinafter are referred to as shanks now lie transversely of such position, whereby the bent crown portions or tops *b* of each link lie respectively over and under the crowns of the two neighboring links. The space which is occupied by the series of links so arranged comprises a band or plate-like form whose width is equal to the length of the links while its thickness is equal to double the thickness of the sides or shanks of the links. The links of a chain such as shown in Figure 1 are made by a cutting or other severing operation according to this invention from a blank having such a band or plate-like formation. If a chain is to be made whose links are rectangular in comcumference and in section then a small plate C (Fig. 2) will serve as stock, two small grooves $e'$ being provided in the face edges $d$ thereof which divide the edges of the plate into two ridges $f$. The crowns $b$ of the chain links are formed from these ridges $f$ and the body of the plate C between the ridges forms the shanks of the links. The separation of the middle portion of the blank C and the four ridges $f$ into the shanks $a$ and crowns $b$ of the links is done by means of cuts which are made from both sides of the stock in a direction vertical to its side faces. The lines along which these cuts are made are indicated in Figure 4 and in this figure those cuts extending through the body or middle portion of the stock are indicated by heavy lines 1, the cuts extending from the side faces down to the groove $e$ are indicated by light lines 2 and 3 and those from the under-face of the stock to the grooves $e$ are indicated by dotted lines $2'$, $3'$. The shanks $a$ of the links are bounded by the cuts 1, and the end parts $b$ by the cuts 2, 3, or $2'$, $3'$. After the cuts 1 and 2, 3 or $2'$ and $3'$ have been made the blank C falls apart forming the links I, II, III, IV which thereupon by twisting and displacing them can be brought into the position assumed in use as shown in Figure 5.

In thus dismembering the blank C into chain elements there is substantially no loss of material except in the first and last links where the loss of material is indicated by shade lines (Figure 4) indicating parts $g$ and $h$ that are wasted.

As shown in Figure 5 the chain links depart from the ordinary form in so far that the shanks $a$ are approximately twice as thick as the crowns $b$. If, however, it is desired that these parts of the links shall have the same strength then stock is prepared which as shown in Figure 6 is twice as thick at the edges as at the middle or even thicker so that the ridges or bars formed by the grooves $e$ will have the same thickness as the middle portion of the stock. The depth of the grooves $e$ is then approximately half the height of the bars $f$. The cuts 1 and 2, 3 or $2'$, $3'$ are then made in the same manner as in the embodiment of the invention shown in Figure 4.

The links made according to the hereinbefore described invention are rectangular in section and have sharp edges. If it is desired that the edges of the crown portions $b$ shall have rounded edges then a blank is utilized in which, as shown in Figure 7, the bars $f$ are rounded and are connected with the body of the blank by connecting parts having curved surfaces. If it should be desired, however, that the shanks $a$ of the links shall have rounded edges then the middle portion of the blank C is provided with arched ribs $i$ (Figures 8 and 9) which after the division of the blank form the shanks of the links.

According to my new process chains can also be made in which the crown portions $b$ of the links are not straight as in Figures 4 and 5, but which have the usual bent form. For this purpose it is only necessary that the cuts 2, 3 and $2'$, $3'$ be made along curved lines as in Figure 10 whereby only an insignificant loss of material occurs due to the discarding of the small triangular pieces between the crowns of the links on account of the cuts 1 and 2, 3, or $2'$, $3'$. The links I, II, III, and IV as shown in Figure 11 will be made precisely in the manner and position illustrated in Figure 1.

In all the different ways of carrying out the process of my invention the lines along which the blank is to be cut up can be formed at the time of making the same as by means of stamped impressions. Furthermore in making the blank the crown portions $b$ of the links which are later to be formed out of the corner or rod portions $f$ can be indicated not only by the grooves $e$ but also by stamped impressions of greater or less depth along the final contour lines of the links. It is particularly feasible to provide such form indications for the end portions $b$ in making the stock C when this is formed by means of rolling or pressing operations.

As shown in Figures 14 and 5 the inner width of a link is equal to twice the thickness of a shank $a$. If links of a greater width are to be made that can be easily done although in such cases there will be a small loss of material between the successive elements of the chain. It is also readily possible to make narrower chain links by cutting the shanks $a$ of the links out of the corner bars $f$ and the crowns $b$ out of the middle or body portion C of the blank, this being made correspondingly narrow.

According to the foregoing invention it is also possible to make closed or endless chains without welded or soldered joints by providing as a blank instead of a band or plate of limited length a circular or elliptical ring which may be dismembered to form links of rectangular section.

The blank C which is to be divided into links can also be made by casting as will be understood. In such case the crown portions $b$ of the links may be cast in final form at the edges of the blank so that all that remains to be done is to cut through it as indicated in Figure 13. The crown portions $b$ of the links are bent in opposite directions in the plane of the blank C as shown in Figures 14 and 15. In order to simplify the making of the mold and the subsequent casting the body of the blank C has transverse ribs *i* which form the chain after cutting apart the shanks *a* (Figure 14).

From blanks such as shown in Figures 10 and 13 links are formed such as shown in Figures 12 and 16 in which the crown portions *b* are not in the same plane as the side portions *a*. They may readily be brought into the same plane by rolling, pressing, or forging, if desired. As will be understood the chains made according to this invention can also undergo any of the usual finishing operations for the purpose of ornamentation.

Figure 17 shows an endless chain made according to my system. The form of the links may vary in accordance with the different modifications herein shown or in other ways.

Having thus fully described my said invention, what I claim as new and desire to secure by Letters Patent; is:

1. An endless weldless chain, substantially as set forth.

2. An endless chain comprising a series of endless, weldless links, substantially as set forth.

3. The method of making a chain from a flat bar comprising forming opposed ridges at the sides of the bar by saw-cuts along each of its longer edges, forming spaced saw-cuts alternately along the bases of said ridges, forming saw-cuts across the bar from ridge to ridge to provide distinct series of links those of the same series being connected at adjacent corners, separating the links in each series by saw-cuts through said ridges, and rearranging the links to form a chain all without loss of material excepting that removed in the form of sawdust, substantially as set forth.

4. The method of making a chain comprising forming a flat blank with slots at the longer edges parallel to each of the adjacent sides said slots providing parallel opposed ridges at each of said edges, cutting through the ridges alternately along their bases to said slots to provide distinct series of links with those of the same series connected at adjacent corners, cutting through the ridges to separate the individual links of each series, and rearranging the links to form a chain all without loss of material excepting that removed in the form of sawdust, substantially as set forth.

5. The method of making weldless chains from a flat blank consisting of forming opposed ridges on each of the longer edges thereof by sawing a slot parallel to the opposite sides of the blank, severing the body of the blank transversely at intervals up to the base of said ridges, severing the adjacent ridges alternately at opposite sides of the blank along the same lines of division as the body of the blank, severing said opposed ridges alternately at intervals from the body of the blank, and rearranging into a chain the links thus formed, substantially as set forth.

In witness whereof, I have hereunto set my hand and seal at Vienna, Austria this 29th day of November, A. D. nineteen hundred and twenty-one.

SÁNDOR BOLGÁR. [L. S.]

Witnesses:
JOSEPH A. BURT,
CHRISTIAN M. ROUNDEL.